(12) United States Patent
Adams et al.

(10) Patent No.: US 9,098,299 B2
(45) Date of Patent: Aug. 4, 2015

(54) RUN TIME INCREMENTAL COMPILATION OF SCRIPT CODE

(75) Inventors: Keith Adams, San Carlos, CA (US); Andrew John Paroski, San Francisco, CA (US); Jason Owen Evans, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 133 days.

(21) Appl. No.: 13/546,893

(22) Filed: Jul. 11, 2012

(65) Prior Publication Data

US 2013/0074052 A1 Mar. 21, 2013

Related U.S. Application Data

(60) Provisional application No. 61/632,819, filed on Sep. 16, 2011.

(51) Int. Cl.
G06F 9/45 (2006.01)
G06F 9/30 (2006.01)

(52) U.S. Cl.
CPC ............ *G06F 8/437* (2013.01); *G06F 9/30192* (2013.01)

(58) Field of Classification Search
CPC .............. G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | |
|---|---|---|---|
| 7,120,572 B1 * | 10/2006 | Liang | 703/26 |
| 2002/0046400 A1 * | 4/2002 | Burch | 717/154 |
| 2007/0226700 A1 * | 9/2007 | Gal et al. | 717/128 |
| 2007/0234288 A1 * | 10/2007 | Lindsey et al. | 717/117 |
| 2007/0277153 A1 * | 11/2007 | Ambrose et al. | 717/120 |
| 2008/0178149 A1 * | 7/2008 | Peterson et al. | 717/110 |
| 2010/0005457 A1 * | 1/2010 | Komatsu et al. | 717/145 |
| 2010/0211638 A1 * | 8/2010 | Rougier | 709/205 |
| 2011/0126185 A1 * | 5/2011 | Waris et al. | 717/169 |
| 2011/0167404 A1 * | 7/2011 | Liu et al. | 717/106 |
| 2012/0192153 A1 * | 7/2012 | Venkatraman et al. | 717/124 |
| 2012/0227034 A1 * | 9/2012 | Ibarra et al. | 717/145 |
| 2013/0055214 A1 * | 2/2013 | Harrison et al. | 717/127 |

OTHER PUBLICATIONS

Swamy et al, Gradual Typing Embedded Securely in JavaScript, 2014.*

(Continued)

*Primary Examiner* — Wei Zhen
*Assistant Examiner* — Zhan Chen
(74) *Attorney, Agent, or Firm* — Fenwick & West LLP

(57) ABSTRACT

Scripts are incrementally compiled at runtime to generate executable code. The incremental compilation generates executable code corresponding to a basic block of the script. The executable code for a basic block of script is generated for a set of types of variables of the basic block resulting from execution of the script in response to a request. The generated executable code is stored and executed for subsequent requests if these requests result in the same types of variables for the basic block. The incremental compilation of the script is performed in a lazy fashion, such that executable code is not generated for combinations of types of variables of the script code that are not obtained from requests received at runtime. The script may dynamically generate portions of a web page that is returned in response to a request for execution of the script.

26 Claims, 9 Drawing Sheets

(56) References Cited

OTHER PUBLICATIONS

Adams, K., et al., "A Comparison of Software and Hardware Techniques for x86 Virtualization," in Proceedings of the 12$^{th}$ International Conference on Architectural Support for Programming Languages and Operating Systems, San Jose, California, USA, Oct. 21-25, 2006, 12 pages.

Bhatia, N., "Virtual Machine Monitor Execution Modes in VMware vSphere™ 4.0," VMware, Inc., 2012, pp. 1-10, can be retrieved at <http://www.vmware.com/files/pdf/perf-vsphere-monitor_modes.pdf>.

* cited by examiner

RUN TIME INCREMENTAL COMPILATION OF SCRIPT CODE

CROSS REFERENCES TO RELATED APPLICATIONS

This application claims the benefit of U.S. Provisional Patent Application No. 61/632,819 filed Sep. 16, 2011, which is incorporated by reference in its entirety.

FIELD OF THE INVENTION

This invention relates to compilation of script code in general and more specifically to incremental compilation of script code at runtime.

BACKGROUND

Scripting languages offer simplicity and ease of development to software developers. Script code is easy to write since scripting languages are often based on a small set of expressions and statements that are simple to learn. Software developers often use scripting languages for rapid development of applications, for example, web applications. Scripting languages may be used for server side programs or for client side programs. Examples of server side scripting languages include PHP (Personal Home Page) and examples of client side scripting languages include JAVASCRIPT.

Server side script code can be used for executing a user request received at a web server by dynamically generating web pages. Server side scripting is often used for implementation of interactive websites that interface with data stores for retrieving and storing information. The PHP scripting language allows embedding of script code with hypertext markup language (HTML). Client side script code is often used for performing simple computations on the client side rather than sending a request to the server for simple computations.

Conventional approaches to execute script code include executing the script code using an interpreter. However, an interpreter may not be able to perform several optimizations that a compiler that generates executable code can perform. Therefore, interpreting script code can be inefficient compared to running executable code obtained by compiling the script code. Furthermore, scripting languages often allow simplified syntax that makes it easier for a user to write script code. For example, scripting languages often support untyped variables that do not require a user to provide type information of the variable. As a result, a compiler processing script code may not have the required information for performing certain optimizations. For example, compiler optimizations often require knowledge of types of the variables that is not available in script code based on untyped variable. As a result, conventional techniques for compiling script code may not be able to generate efficient executable code.

SUMMARY

Embodiments of the invention incrementally compile script code at runtime to generate executable code. The incremental compilation generates executable code corresponding to basic blocks of the script code. Executable code for each basic block is generated for a set of types of variables of the basic block determined by executing the script code.

A script compiler receives a request to execute particular script code. The script compiler identifies a basic block of the script code for compilation and determines types of variables of the basic block based on the execution of the script code. The script compiler generates an executable basic block corresponding to the identified basic block. The script compiler stores the executable basic block for use in subsequent executions of the basic block.

The script compiler may check if an executable basic block corresponding to the basic block was previously generated for the set of types determined. The script compiler generates executable basic block for the basic block if there was no executable basic block previously generated. If a subsequent request is received that results in different variable types for a basic block from the script, the script compiler generates executable basic block for the basic block based on the new variable types.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
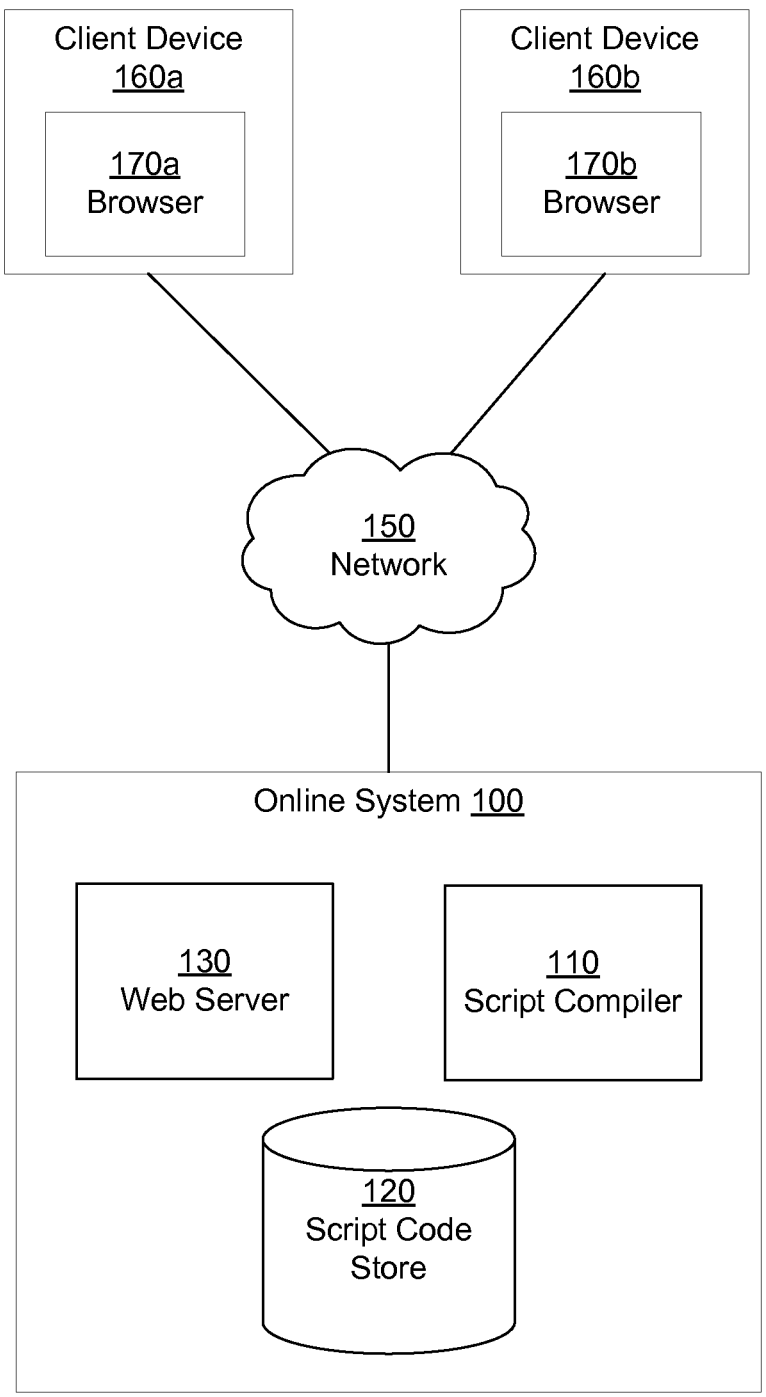
FIG. 1 is a diagram illustrating a system environment comprising client devices interacting with an online system that generates dynamic web pages using script code, in accordance with one embodiment of the invention.

FIG. 1 shows a system environment for allowing a client device to interact with an online system that generates dynamic web pages by compiling script code, in accordance with one embodiment of the invention. FIG. 1 illustrates client devices 160 interacting with an online system 100 using the network 150. The client devices 160 send requests to the online system 100 via the network 150. The online system 100 may dynamically generate web pages in response to the request and send the generated web pages to the client device 160 in response to the request.

FIG. 1 and the other figures use like reference numerals to identify like elements. A letter after a reference numeral, such as "160a," indicates that the text refers specifically to the element having that particular reference numeral. A reference numeral in the text without a following letter, such as "160," refers to any or all of the elements in the figures bearing that reference numeral (e.g. "160" in the text refers to reference numerals "160a" and/or "160b" in the figures).

Embodiments of the computing environment can have multiple client devices 160 and multiple online systems 100 connected to the network 150. Certain functionality described in one embodiment as being performed on the server side can also be performed on the client side in other embodiments if appropriate. For example, although FIG. 1 shows the script compiler 110 running on the online system 100 for compiling server side script code, in other embodiments, the script compiler 110 may run on the client device 160 for compiling client side script code. In addition, the functionality attributed to a particular component can be performed by different or multiple components operating together.

The client devices 160 comprise one or more computing devices that can receive user input and can transmit and receive data via the network 150. In one embodiment, the client device 165 is a conventional computer system executing, for example, a Microsoft Windows-compatible operating system (OS), Apple OS X, and/or a Linux distribution. In another embodiment, the client device 160 can be a device having computer functionality, such as a personal digital assistant (PDA), mobile telephone, video game system, etc.

The client device 160 is configured to communicate via network 150. The client device 160 can execute an application, for example, a browser application 170 that allows a user of the client device 160 to interact with the online system 100. A user may provide input using a user interface presented to the user via the browser application 170. The interactions of the user via the browser application 170 may cause the browser application 170 to send a request for information that identifies a markup language document comprising server side scripting code. The markup language document is processed to obtain a transformed markup language document that is returned in response to the request.

The network 150 uses standard communications technologies and/or protocols. Thus, the network 150 can include links using technologies such as Ethernet, 802.11, worldwide interoperability for microwave access (WiMAX), 3G, digital subscriber line (DSL), etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The online system 100 comprises a web server 130, a script compiler 110 and a script code store 120. The web server 130 is a module processing requests received by the online system 100 from client devices 160 or other external systems that interact with the online system 100. The web server 110 may be implemented by conventional web server software, such as APACHE or INTERNET INFORMATION SERVICES. In response to a request from a client device 160, the web server 130 may invoke other modules of the online system 100 to process the request. For example, the web server 130 may invoke modules of the online system 100 to obtain a web page in response to the request from the client device 160. The web server 130 sends the web page to the client device 160 for presentation on the browser 170.

The script code store 120 stores script code that implements portions of functionality provided by the online system 100 to client devices 160. A script code may comprise a function, procedure, method, or a block of code that may be embedded within an hypertext markup language (HTML) document. The script code implements functionality, for example, retrieving information stored in various databases of the online system 100, performing computations, or interacting with other systems.

The script compiler 110 takes script code in source code form and generates equivalent executable code for execution by a processor of the online system 100 (in this disclosure, the term "script code" is also referred to as "script.") In an embodiment, the script compiler 110 performs incremental compilation of the script code in a lazy fashion. For example, a portion of script code is compiled if a request causes this portion of script code to execute. Once a portion of the script code is compiled, the generated executable code is available for future requests. However, if no request received by the online system 100 needs to execute a particular portion of the script code, that particular portion may not be compiled. Therefore, no executable code corresponding to a particular portion of script may exist in the online system 100 if no request from a client device needs to execute that portion of script. For example, a script may comprise an "if-then-else" statement that executes an "if" portion of script if a condition evaluates to true and an "else" portion of script if the condition evaluates to false. If all incoming requests evaluate the condition to a true value, these request only execute the "if" part of the script. Accordingly, executable code corresponding to the "else" part of the "if-then-else" statement may never be generated, unless an incoming request results in the condition being evaluated to a false value.

Figure 2:
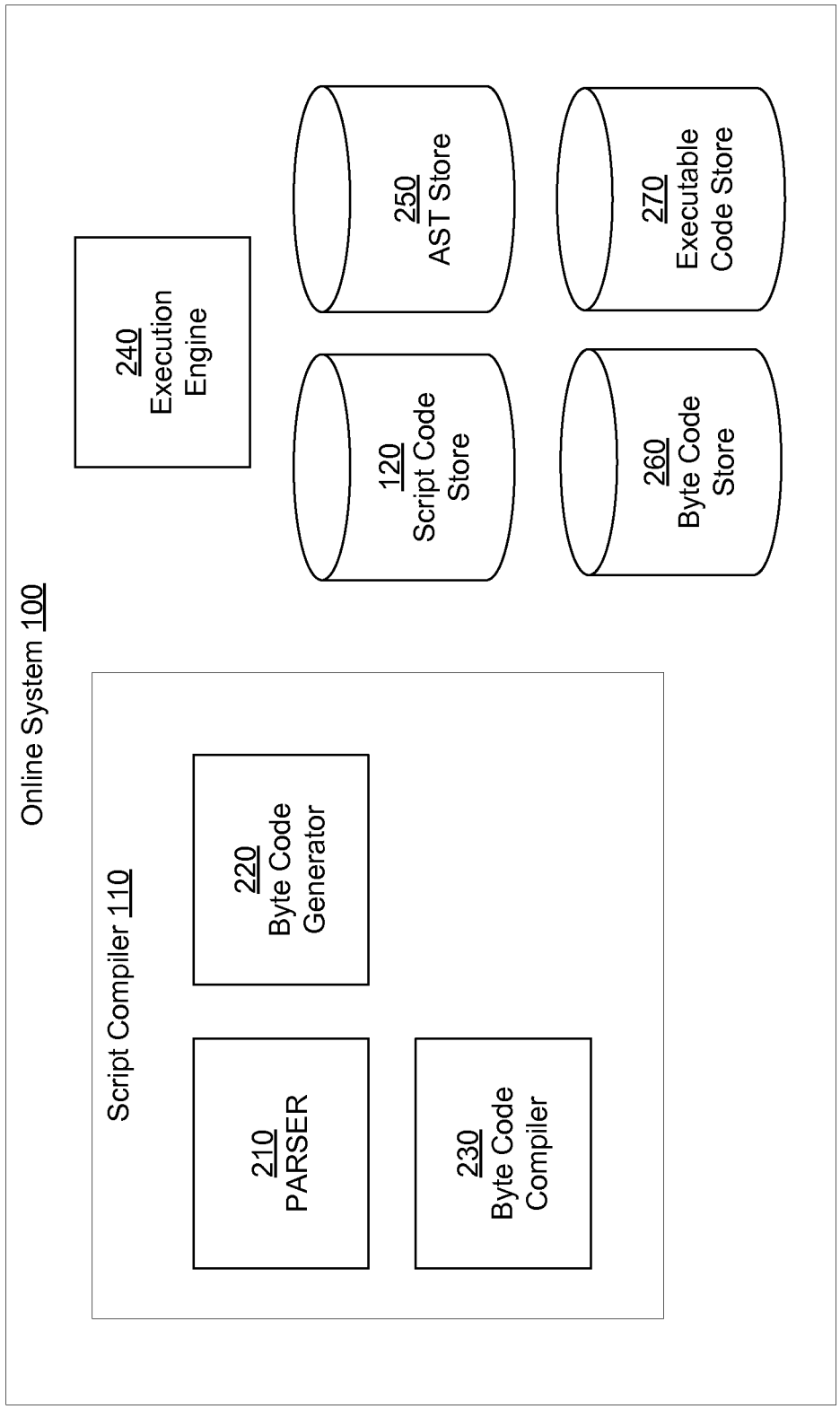
FIG. 2 is a diagram illustrating the architecture of an online system that generates dynamic web pages by incrementally compiling script code at runtime, in accordance with one embodiment of the invention.

FIG. 2 shows a diagram illustrating the architecture of an online system 100 that generates dynamic web pages by incrementally compiling script code at runtime, in accordance with one embodiment of the invention. The online system comprises the script code store 120, an abstract syntax tree (AST) store 250, a byte code store 260, an executable code store 270, an execution engine 240, and the script compiler 110. The script compiler 110 further comprises a parser 210, a byte code generator 220, and a byte code compiler 230. Some embodiments of the online system 100 have different and/or other modules than the ones described herein, and the functions can be distributed among the modules in a different manner than is described here. For example, several modules shown in the online system 100 may be present in a client device 160 if the script code being processed is client side script code.

The script code store 120 stores script code, for example, script code specified as PHP, server side JAVASCRIPT, or another syntax. The script code may be input by a software developer using an editor or copied from another computer. In an embodiment, the script code is specified in a human readable text form. The parser 210 reads the script code from one or more files in the script code store 120 and builds a data structure called an abstract syntax tree (AST) that is stored in the AST store 250. The AST is a hierarchical tree representation of script code. The parser 125 checks the script code for syntax errors and reports the errors to allow a user to correct the errors.

The byte code generator 220 traverses the abstract syntax tree representation of the script code and generates byte code corresponding to the script code. The byte code is stored in the byte code store 260. The byte code comprises code represented using an instruction set that is designed for efficient execution by an interpreter or for efficient compilation into executable code, for example, machine code. The byte code instructions may correspond to a virtual stack machine or a virtual register machine. The byte code compiler 230 converts byte code into executable code and stores the generated executable code in the executable code store 270.

The execution engine 240 executes the instructions available in the executable store 270. For example, the execution engine 240 may be invoked in response to a request received from a client device 160. The execution engine 240 identifies executable code corresponding to the request received for execution. An online system 100 may compile all available byte code stored in the byte code store 260, for example, as a batch process and store the generated executable code in the executable code store 270. Compiling all available byte code store in advance ensures that executable code is readily available for any request that is received by the online system, so long as the corresponding script code is available in the script code store 120. However, script code typically supports features that make it difficult to generate efficient executable code. For example, script code may support untyped variable for which the type is not available until runtime. Programmers often use untyped variables since they do not require the programmer to make early decisions regarding types of variables used. A programmer may specify a variable as untyped even if at runtime the variable only stores values of one particular type, for example, an integer value. In practice significant amount of script code is executed based on a limited set of types corresponding to the untyped variables. However, if the online system 100 compiles the byte code to executable code prior to receiving the requests at runtime, the type information may not be available for the variables. A byte code compiler 230 that compiles the byte code without making any specific assumptions about the types of the variables may generate inefficient executable code since the generated executable code accounts for all possible types that each untyped variable may take, whether or not the incoming requests use these types.

Embodiments of the byte code compiler 230 compile byte code to executable code based on information available at runtime. For example, the byte code compiler 230 may utilize type information of variables obtained during an execution of the script code to generate executable code optimized for these specific types. Accordingly, executable code required for executing a request may or may not be available in the executable code store 270 at runtime. If executable code corresponding to the request is not available in the executable code store 270, the execution engine 240 identifies byte code corresponding to the request from the byte code store 230. The execution engine 240 invokes the byte code compiler 230 to compile the byte code corresponding to the request to generate executable code. The execution engine 240 provides type information of variables obtained during the current execution of the script code to the byte code compiler 230. Accordingly, the byte code compiler 230 generates efficient executable code based on the type information of variables available. The execution engine 240 executes the generated executable code. In some embodiments, executable code may be generated directly from script code without requiring byte code generation.

If future executions of the script code provide variables of the same type as the first request, the executable code can be reused for the future requests. However, if a subsequent execution provides a different combination of types of variables compared to the first execution, the execution engine 240 invokes the byte code compiler 230 to generate executable code corresponding to the new combination of types corresponding to the variables. Accordingly, the executable code store 270 may store different executable codes for the same byte code program, each executable code corresponding to a different combination of variable types. The byte code compiler 230 may never generate executable code corresponding to type combinations that are never received in executions of the script code.

In an embodiment, the byte code compiler 230 compiles a basic block of byte code at a time. A basic block of code has one entry point, i.e., no instruction within the basic block other than the entry point can be reached from anywhere in the script code as a destination of a jump instruction. The entry point is typically the first instruction of the basic block. A basic block may have one or more exit point, i.e., typically the last instruction of the basic block causes the program control to start executing another basic block. The last instruction may evaluate certain condition and determine the next basic block for execution based on the result of the evaluation of the condition. For example, the last instruction may evaluate a binary condition and transfer program control to one basic block if the condition evaluates to true otherwise transfer program control to another basic block (if condition evaluates to false). Similarly, the last instruction of the basic block may transfer control to different basic blocks based on the value of a particular variable. For example, if the variable value is 1, program control is transferred to basic block B1, if the variable value is 2, program control is transferred to basic block B2, if the variable value is 3, program control is transferred to basic block B3, and so on. The simple structure of a basic block makes it easy for the byte code compiler 230 to optimize and compile a basic block.

Figure 3:
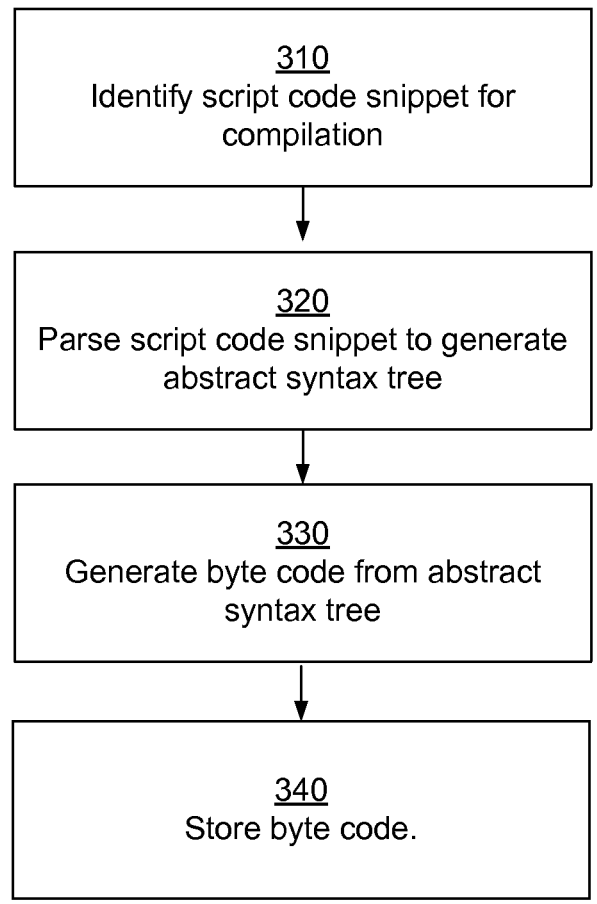
FIG. 3 is a flow diagram illustrating the process of compiling script code, in accordance with one embodiment of the invention.

FIG. 3 is a flow diagram illustrating the process of compiling script code, in accordance with one embodiment of the invention. The process illustrated in FIG. 3 may be executed by the script compiler 110 as a batch process that compiles script code stored in the script code store 120. For example, software developers may periodically provide new scripts implementing certain features of the online system 100. The received script code may be compiled as a batch process by the online system 100. Alternatively, software developers may update existing script code, thereby requiring recompilation of the updated script code. The script compiler 110 may repeat the steps shown in FIG. 3 for all the script code that need to be recompiled.

The script compiler 110 identifies 310 a script for compilation. The script compiler 110 invokes the parser 210 for parsing the script. The parser 210 parses 320 the script code to generate an abstract syntax tree (AST) representation of the script code. The parser 210 stores the AST representation in the AST store 250. In an embodiment, modules of the script compiler 110 perform various operations using the AST representation, for example, static analysis, type inference, and optimizations. As a result, the script compiler 110 may annotate the AST and/or transform the AST. The script compiler 110 stores the annotated ASTs or the transformed ASTs in the AST store 250. Each step performed by the script compiler 110 typically use the latest version of the AST from the AST store 250 and generates a subsequent version of the AST. The byte code compiler 230 generates 330 byte code from the AST representation of the script code and stores 340 the generated byte code in the byte code store 260.

The byte code compiler 230 incrementally compiles the byte code stored in the byte code store at runtime to generate corresponding executable code. The byte code compiler 230 performs the incremental compilation responsive to executions of the script code, for example, executions caused by requests received from client devices 160.

Figure 4:
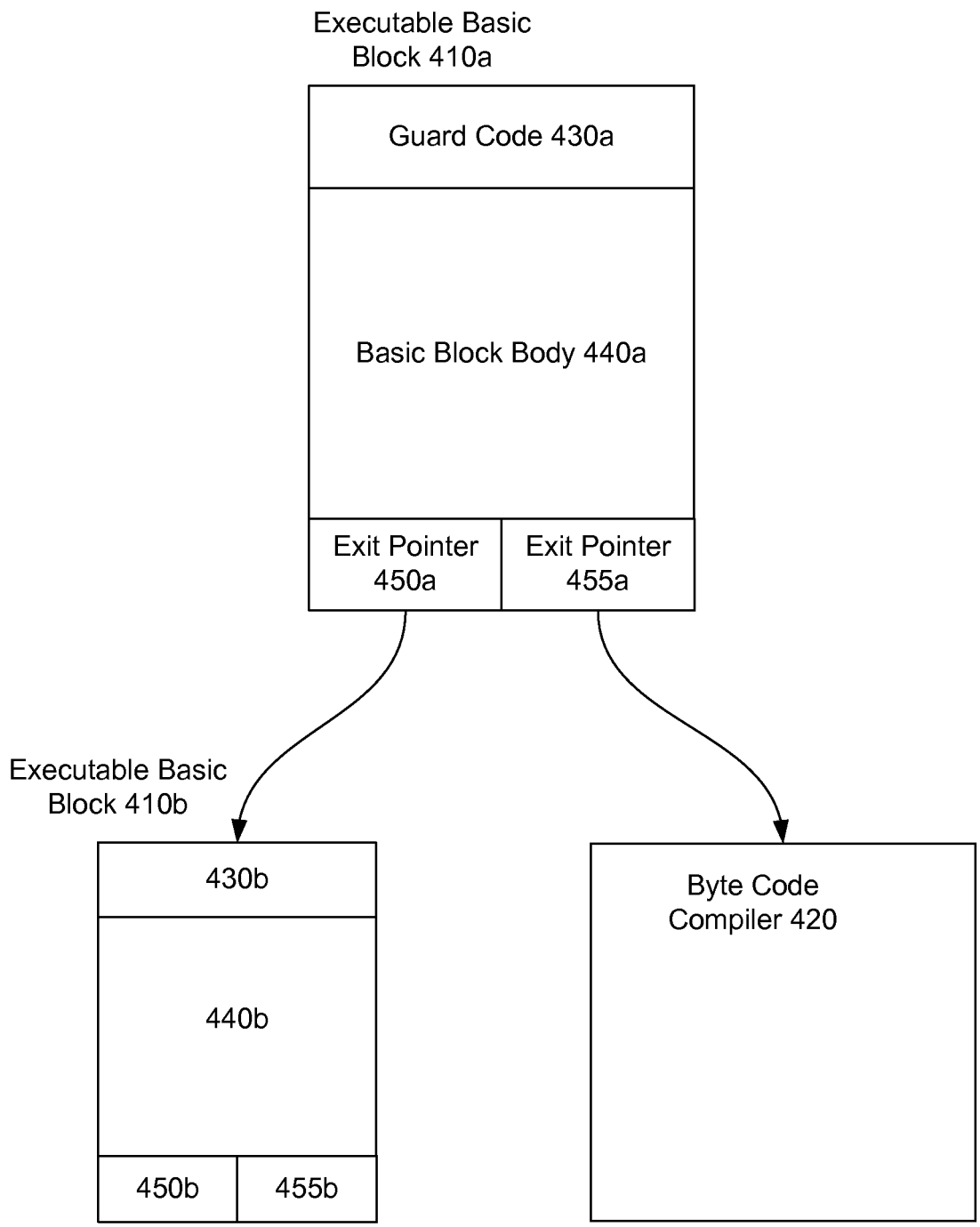
FIG. 4 is a diagram illustrating the structure of executable code generated by a script compiler, in accordance with one embodiment of the invention.

The execution engine 240 requests compilation of one basic block of byte code at a time. More specifically, the execution engine 240 requests compilation of one basic block for a particular combination of types of the variables as required for execution of an incoming request. FIG. 4 is a diagram illustrating the structure of executable code generated by a script compiler, in accordance with one embodiment of the invention. The generated executable basic block 410 comprises a portion of guard code 430, a basic block body 440, and one or more exit pointers 450. The executable basic block 410 is generated in response to receiving a request from the client device 160. Accordingly, the executable basic block 410 is optimized for the types of variables as provided by the incoming request.

The following example illustrates how executable code is generated for a given basic block. Assume that a basic block comprises two untyped variables varA and varB. Further assume that for a particular execution it is determined that both variables varA and varB are integers. Accordingly, the byte code compiler 230 compiles the basic block to generate the basic block body 440 assuming the variables varA and varB are integers. The guard code 430 comprises instructions that check a particular condition before executing the basic block body 440. In the above example, the generated guard code 430 verifies that the types of variables varA and varB are integers. If the types of both variables are integers, the guard code 430 continues execution of the basic block body 440.

The last instruction of an executable basic block 410*a* that is executed typically causes the program control to begin execution of another executable basic block 410*b*. Accordingly, the last instruction of the executable basic block 410 may comprise an exit pointer 450 that specifies the address of an executable basic block 410*b* for execution after the execution of the executable basic block 410. The last instruction of an executable basic block 410*a* that is executed may transfer control to different executable basic blocks 410 depending on certain criteria. For example, the last instruction in a basic block may correspond to an "if" condition that executes one basic block if the condition is evaluated to true and another basic block if the condition is evaluated to false. Therefore, the last instruction of the executable basic block 410 may comprise one or more exit pointers 450*a*, 455*a*, and so on.

As shown in FIG. 4, the exit pointer 450*a* points to another executable basic block 410*b*. If a particular executable block that needs to be executed subsequent to the execution of the executable basic block 410*a* has not been compiled so as to generate a corresponding executable basic block, the corresponding exit pointer 455*a* transfers control to the byte code compiler 420. The byte code compiler 420 may be provided with information describing the subsequent basic block that needs to be compiled. The address of the subsequent basic block may be communicated to the byte code compiler 420 using function-calling conventions of the native machine in which the system is hosted. In this embodiment, the byte code compiler 420 obtains the address of the byte code corresponding to the subsequent basic block to be compiled from the top of the stack. Once the byte code compiler 420 generates an executable basic block 410 corresponding to the subsequent basic block, the pointer 455*a* is changed to point to the generated executable basic block instead of the byte code compiler 420.

Figure 5A:
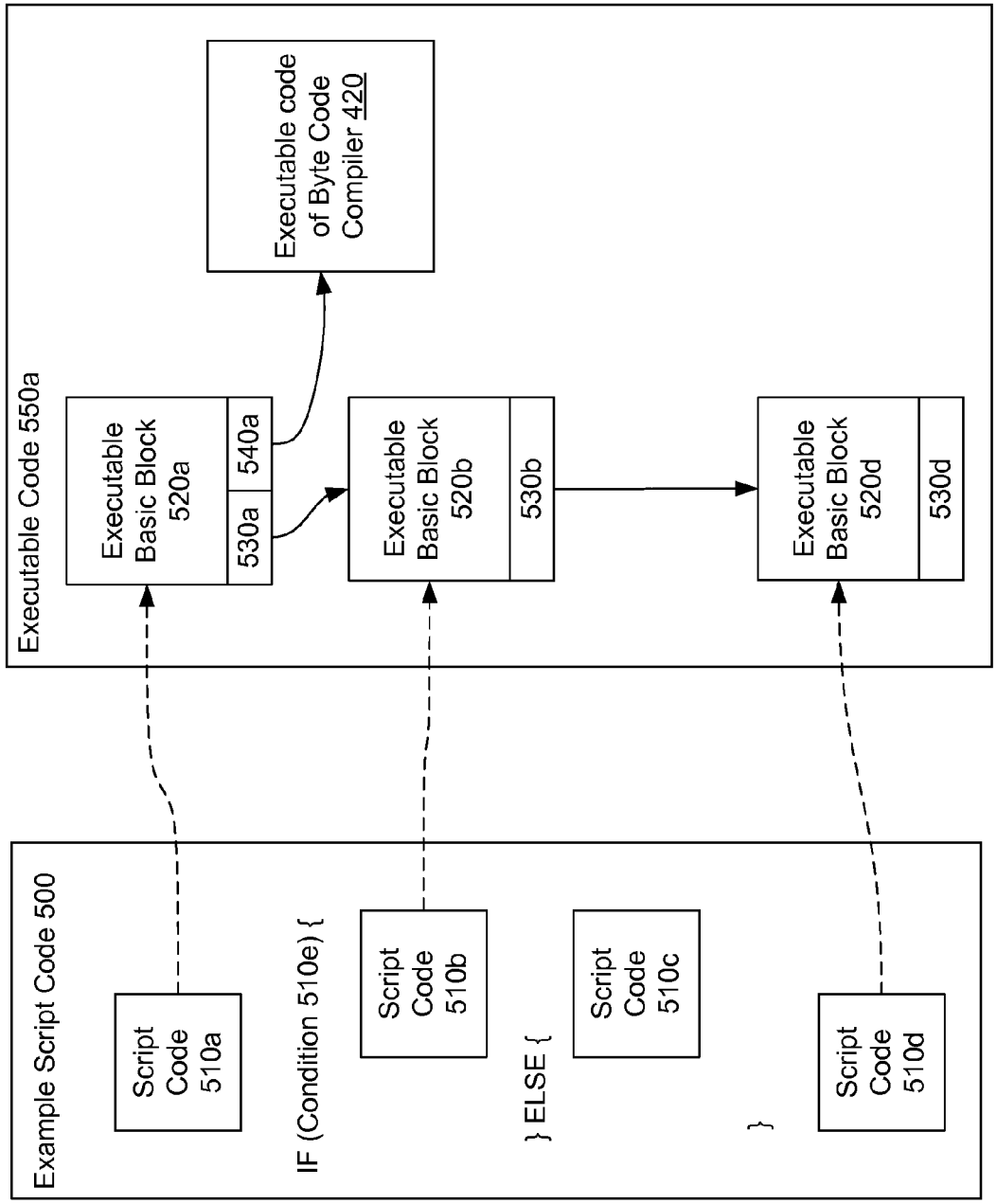
FIGS. 5(a-b) are diagrams illustrating incremental compilation of byte code obtained from an example script code, in accordance with one embodiment of the invention.
Figure 5B:
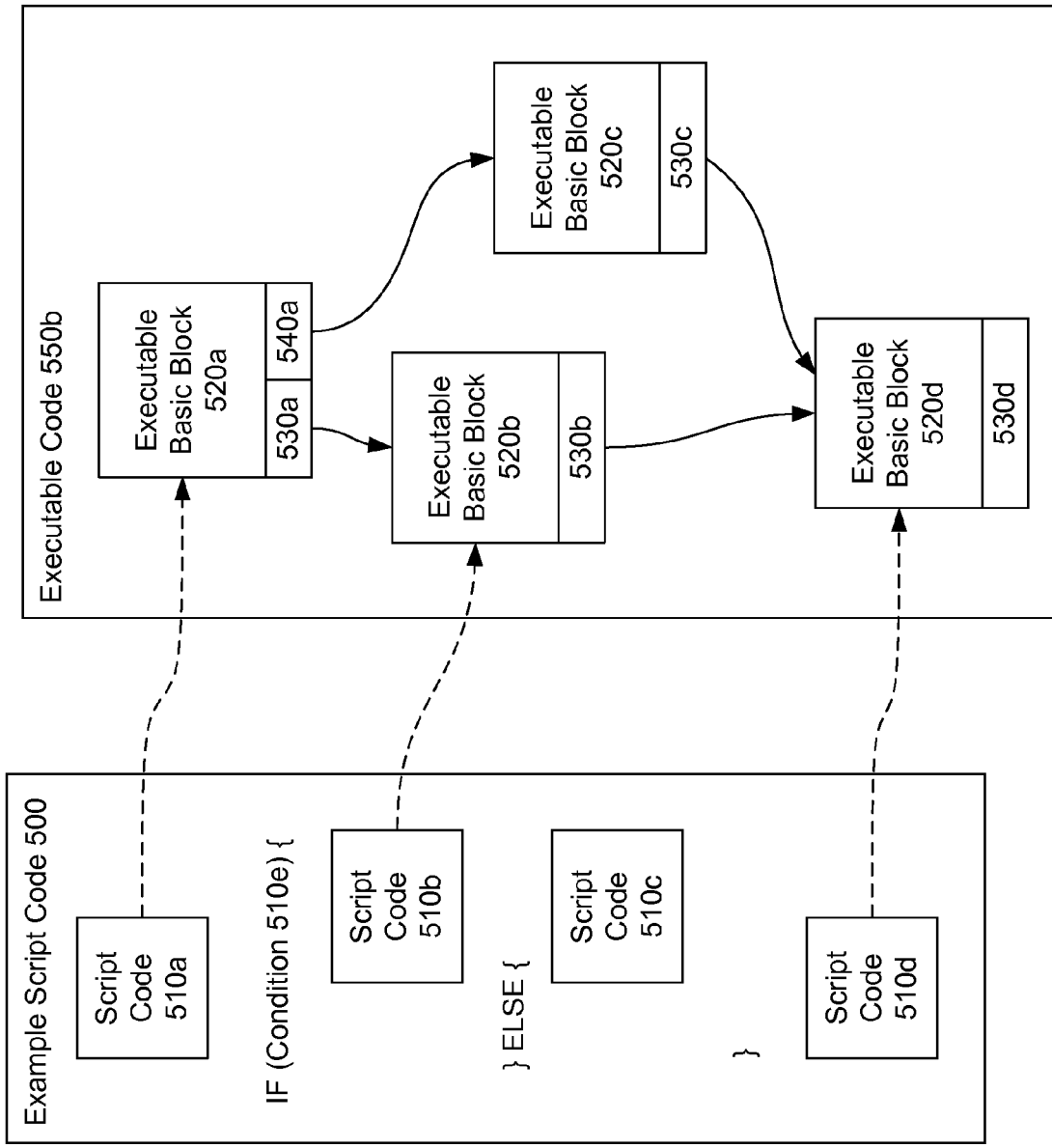

FIG. 5(*a-b*) are diagrams illustrating incremental compilation of byte code obtained from an example script code, in accordance with one embodiment of the invention. FIG. 5(*a*) shows an example script code 500 executed in response to a request coming from client device 160. The example script code 500 comprises a portion of byte code 510*a* followed by an if-then-else statement, followed by another portion of byte code 510*d*. The if-then-else statement comprises a condition 510*e*, a portion of byte code 510*b* that is executed if condition 510*e* evaluates to true, and a portion of byte code 510*c* that is executed if the condition 510*e* evaluates to false.

Assume that a request is received from a client 160 that comprises values of variables that result in the condition 410*e* evaluating to true. The resulting executable code generated by the byte code compiler 230 comprises the executable code 550*a* shown in FIG. 5(*a*). The portion of script code 510*a* combined with the condition 510*e* corresponds to executable code 520*a*. The executable code 520 includes a guard code 430 in the beginning to verify whether the types of the variables correspond to a specific combination. The end of the executable code 520*a* comprises instructions evaluating the condition 510*e*. If the condition 410*e* evaluates to true, the program control is transferred according to exit pointer 530*a* otherwise the program control is transferred according to exit pointer 540*a*.

Since the current request received from the client 160 results in the condition 410*e* evaluating to true, the executable basic block 520*b* corresponding to portion of script code 510*b* is also generated. The script code 500 shows that after execution of script code 510*b*, the script code 510*d* is executed. Accordingly, the executable basic block 520*d* corresponding to the script code 510*d* is also generated. For the execution of the current request, the script code 510*c* is never executed since it corresponds to the "else" portion of the if-the-else statement that is not executed when the condition 510*e* evaluates to true. Accordingly, the end of executable basic block 520*a* comprises an exit pointer 540*a* pointing to the byte code compiler 230 with information identifying byte code corresponding to script code 510*c*.

If several subsequent requests all comprise variables with types matching those corresponding to the previous request and result in condition 510*e* evaluating to true, the executable code 550*a* can be executed to process these requests. A new set of executable code 550 may be generated if a request is received that requires execution of script code 500 with a new combination of types of variables, different from those corresponding to executable code 550. However, if all requests received from the client device 160 continue providing the same combination of variable types and always result in the condition 510*e* evaluating to true, the executable code 550 continues to process the requests and no new executable code needs to be generated.

If at any stage, an execution of the script code is performed that provides the previous combination of variable types that cause the condition 510*e* to evaluate to false, the executable code 550*a* gets modified to executable code 550*b* as shown in FIG. 5(*b*). Since the condition 510*e* evaluates to false, the exit pointer 540*a* causes the byte code compiler 420 to be invoked causing an executable basic block 520*c* to be generated corresponding to the script code 510*c*. The script compiler 110 changes the exit pointer 540*a* to point to the generated executable basic block 520*c* instead of the byte code compiler 420. Since the execution of the script code 510*c* is followed by the execution of the script code 510*d*, the exit pointer 530*c* at the end of the executable basic block 520*c* is configured to point to the executable block 520*d* corresponding to script code 510*d*. The executable code 550*b* can process requests that result in the condition 510*e* evaluating to true as well as false without having to invoke the byte code compiler 420. Furthermore, the executable basic block 520*c* is not generated unless an execution that causes the condition 510*e* to evaluate to false is received. Accordingly, the script compiler 110 generates executable code in a lazy fashion, the generation performed only if a request requires certain portion of script code to be executed. As a result, the script compiler 110 does not generate dead code, i.e., code that is never executed.

Figure 6A:
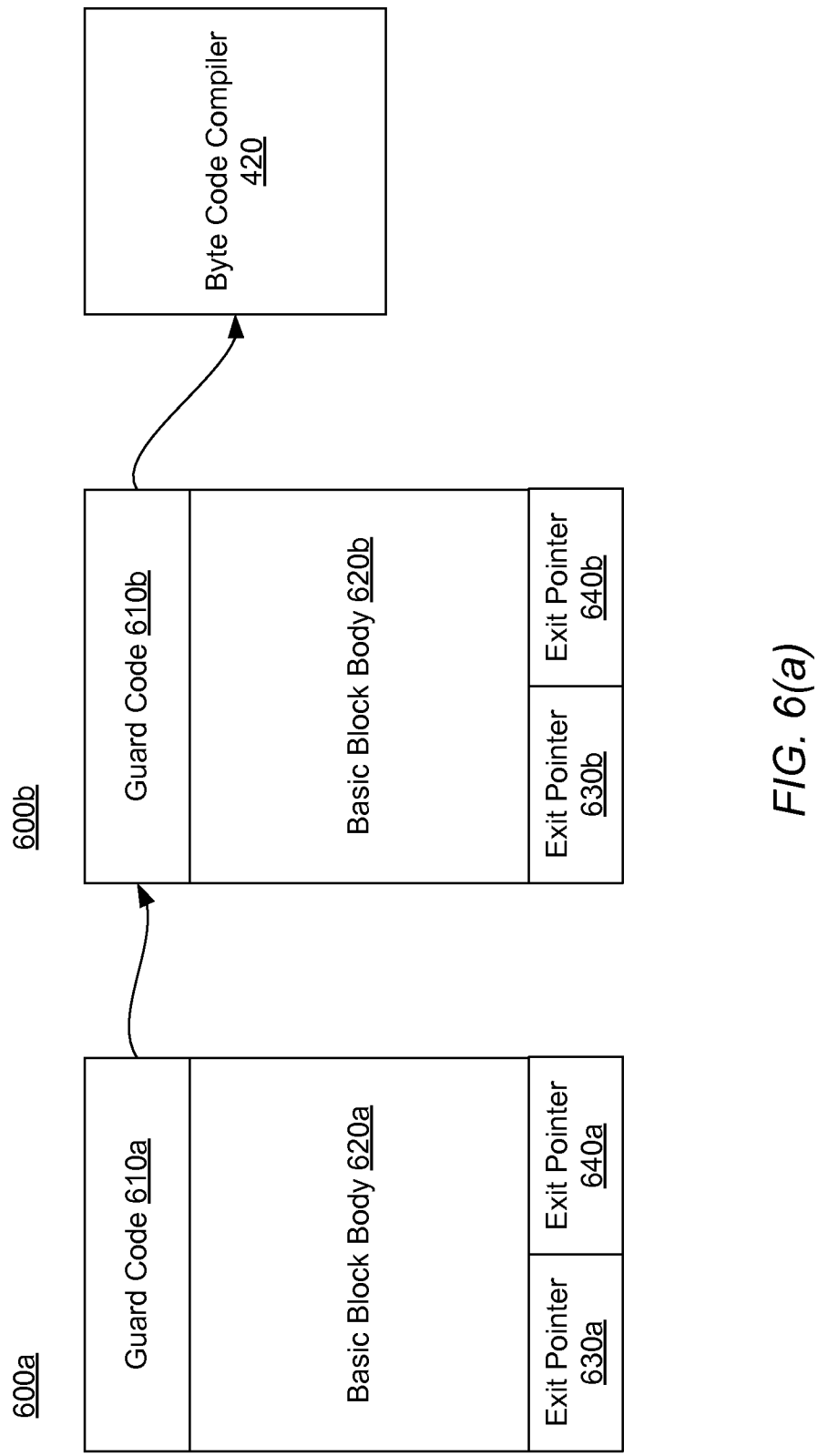
FIGS. 6(a-b) illustrate the structure of the executable code for a basic block, in accordance with one embodiment of the invention.
Figure 6B:
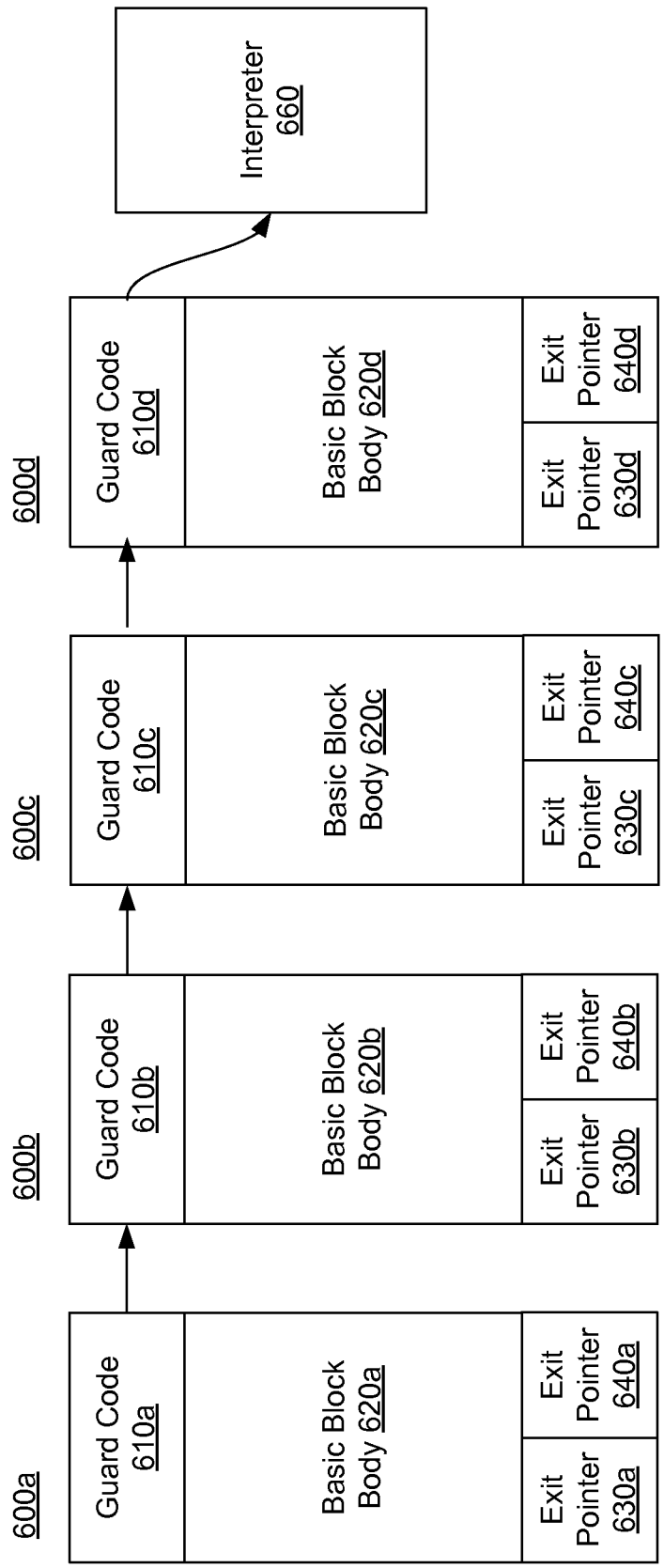

FIGS. 6(*a-b*) illustrate the structure of the executable code for a basic block, in accordance with one embodiment of the invention. As shown in FIG. 6, each basic block may result in generation of one or more basic block executable code fragments 600, each executable code fragments 600 corresponding to a particular combination of types of variables in the basic block. Each executable code fragment 600 for a basic block includes a guard code 610, the basic block body 620, and exit pointers 630, 640. If all executions of the script code encountered so far by the script compiler 110 provide the same combination of variable types for the basic block, a single executable code fragment 600*a* is generated for the basic block. If a particular execution results in a new combination of variable types, another executable code fragment 600*b* is generated as shown in FIG. 6(*b*). The guard code 610*a* checks if the variable types provided in the current execution match the variable types corresponding to the executable code fragment 600*a*. If the variable types provided in the current execution match the variable types of the executable code fragment 600*a*, the basic block body 620*a* is executed. Similarly, guard code 610*b* checks if the variable types provided in the current execution match the variable types corresponding to executable code fragment 600*b*. If the variable types provided in the current execution match the variable types corresponding to the executable code fragment 600*b*, the basic block body 620*b* is executed. If the current execution provides a combination of variable types that is different from these two types, the byte code compiler 420 is invoked to generate a new basic block executable code fragment 600 for the new combination of types.

As shown in FIG. 6, multiple executable code fragments 600 may be generated for the same basic block. In an embodiment, no more than a threshold number of executable code fragments 600 are generated for any basic block, for example the value of threshold can be 4 or 5. After the threshold number of executable code fragments 600 are generated for a basic block, if a new variable type combination is encountered during execution of the script, the basic block code is executed by the interpreter 660 as shown in FIG. 6(*b*).

In an embodiment, the order in which the guard code 610 of the various executable code fragments 600 for a basic block is executed is determined based on a likelihood of encountering the combination of variable types corresponding to the executable code fragment 600. The likelihood of encountering a combination of types may be determined based on historical patterns of occurrence of each combination of type. In an embodiment, the executable code store 270 maintains statistics describing the number of times each combination of variable types corresponding to each executable code fragment 600 of a basic block is encountered. The combination of variable types that has been encountered the most in the past executions of the basic block is assumed to be the combination most likely to be encountered in subsequent executions of the script code. Accordingly, the guard code 610 of the executable code fragment 600 corresponding to this particular variable type combinations is executed first as shown in FIG. 6. Similarly, the guard code 610 of the executable code fragment 600 corresponding to the variable type combination that is second most likely to occur is executed next, and so on. If, the likelihood of the encountering the various variable type combinations for the basic block changes over time, the basic blocks as shown in FIG. 6 are rearranged such that the guard codes 610 are executed according to the updated order of likelihood of encountering the variable type combinations. For example, as shown in FIG. 6(*b*), the combination of variable types corresponding to executable code fragment 610*a* is most likely to be encountered, followed by the combination of variable types corresponding to executable code fragment 610*b*, followed by the combination of variable types corresponding to executable code fragment 610*c* and 610*d*. If over time, the combination of variable types corresponding to executable code fragment 610*b* becomes more likely to occur than the combination of variable types corresponding to executable code fragment 610*a*, the order in which the guard codes are executed is changed from 610*a*, 610*b*, 610*c*, and 610*d* to 610*b*, 610*a*, 610*c*, and 610*d*.

Figure 7:
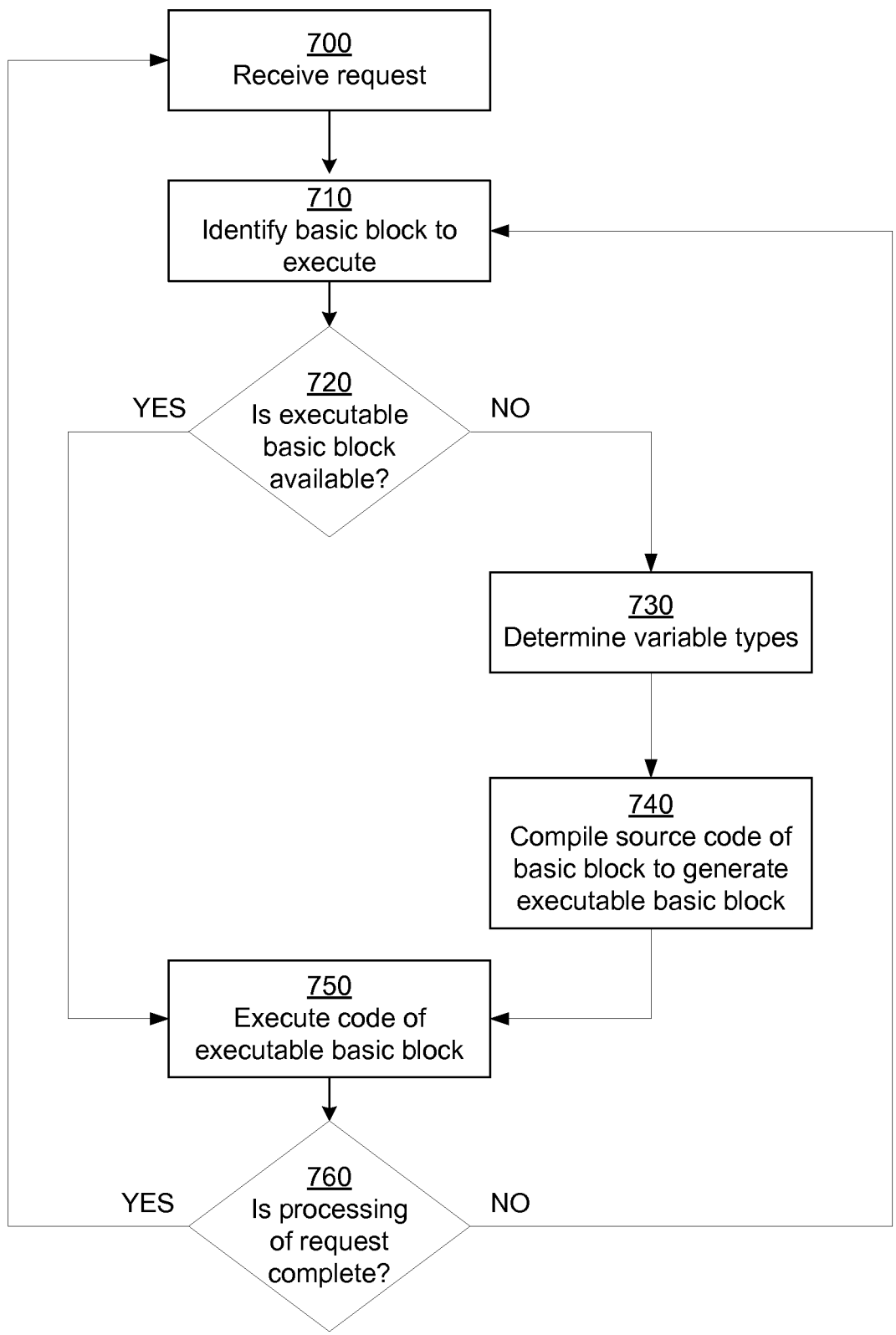
FIG. 7 is a diagram illustrating the process for incrementally compiling script code at runtime, in accordance with one embodiment of the invention.

FIG. 7 is a diagram illustrating the process for incrementally compiling script code at runtime, in accordance with one embodiment of the invention. The web server 130 receives a request from the client device 160 that requires execution of script code from the script code store 120 in order to dynamically generate a web page. The web server 130 invokes the execution engine 240 to process the received request. Accordingly, the execution engine 240 receives 700 the request from the web server 130 to process it.

Based on the types of variables of the script code that needs to be executed, the execution engine 240 identifies 710 a basic block that needs to be executed in order to begin processing of the request received 700. The execution engine 240 determines 720 whether executable basic block corresponding to the basic block identified 710 is available. If execution engine 240 determines 720 that the executable basic block corresponding to the basic block identified 710 exists, the executable basic block is executed 750.

If the executable basic block corresponding to the basic block identified 710 is determined 720 not to exist, the execution engine 240 analyzes the identified basic block to determine 730 the types of the variables of the basic block. The execution engine 240 invokes the byte code compiler 230 to compile 740 the script code to generate an appropriate executable basic block. Since the compilation 740 of basic block assumes a specific set of types for the variables, the script compiler can perform optimizations if possible. The script compiler 110 does not have to generate executable code assuming untyped variables with no type information. Instead, the script compiler 110 can treat the untyped variables as if they had the types as determined 730 for the variables. The execution engine 240 further executes 750 the generated executable basic block. The execution engine 240 determines 760 whether this is the last basic block to be executed in response to the request received 700. If the current basic block that is executed is determined 760 to be the last basic block corresponding to the request received 700, the execution engine 240 may process another request received 700 from the web server 130 using the above steps. If the execution engine 240 determines 760 that there are more basic blocks to be processed for this request, the execution engine 240 identifies 710 the next basic block to be processed, for example, by using an exit pointer at the end of the previous basic block that was executed. The execution engine 240 continues executing the basic blocks corresponding to this request until the execution of all basic blocks for this request is complete.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    storing a script comprising basic blocks, wherein a basic block is a set of instructions with a single entry point, the script using one or more untyped variables;
    for each of a set of basic blocks of the script, storing a plurality of executable basic blocks for the basic block, each executable basic block comprising code optimized for a set of types of untyped variables used in the basic block;
    receiving a request for executing the script;
    identifying a basic block from the script for execution;
    receiving an input set of values for variables of the basic block;
    determining an input set of types of untyped variables of the basic block based on the input set of values;
    determining whether the input set of types of untyped variables match a set of types of a stored executable basic block for the basic block; and
    executing an executable basic block for the basic block if the input set of types of untyped variables match the set of types of the executable basic block.

2. The computer implemented method of claim 1, further comprising:
    checking if at least one executable basic block corresponding to the basic block is available; and
    wherein the executable basic block corresponding to the basic block is generated responsive to determining that no executable basic block corresponding to the basic block is available.

3. The computer implemented method of claim 1, wherein the request received is a first request, the method further comprising:
    receiving a second request for subsequent execution of the script; and
    responsive to determining that executable code corresponding to the basic block was previously generated for the set of types, executing instructions of the executable basic block for the subsequent execution of the script.

4. The computer implemented method of claim 1, wherein the executable basic block transfers control to a subsequent executable basic block for execution for processing the script.

5. The computer implemented method of claim 1, wherein the executable basic block transfers control to a byte code compiler responsive to determining that executable code for a subsequent basic block was not previously generated.

6. The computer implemented method of claim 1, wherein the executable basic block evaluates a condition, the executable basic block configured to:
    transfer control to a first executable basic block for execution responsive to the condition evaluating to true; and
    transfer control to a second executable basic block for execution responsive to the condition evaluating to false.

7. The computer implemented method of claim 1, wherein the script is configured to generate portions of a dynamically generated web page.

8. The computer implemented method of claim 7, further comprising:
    sending the dynamically generated web page to the sender of the request.

9. The computer implemented method of claim 1, wherein the request is a first request, the input set of values is a first input set of values, the set of types is a first set of types, and the executable basic block is a first executable basic block, the method further comprising:
    receiving a second request for execution of the script;
    receiving a second input set of values for variables of the basic block;
    determining that the second input set of values does not conform to the first set of types;
    responsive to determining that the second input set of values does not conform to the first set of types, generating a second executable basic block for the basic block; and
    storing the second executable basic block.

10. The computer implemented method of claim 1, further comprising:
    maintaining statistics indicating a historical frequency of occurrence of each set of types of untyped variables corresponding to each of the plurality of executable basic blocks; and
    ordering the executable basic blocks based on the historical frequency of occurrence of the set of types corresponding to each executable basic block.

11. The computer implemented method of claim 1, further comprising:

determining an estimate of a likelihood of occurrence each set of types of untyped variables associated with executable basic blocks of the plurality; and ordering the executable basic blocks of the plurality in decreasing order of likelihood of occurrence of set of types for each executable basic block.

12. The computer implemented method of claim 11, further comprising:

monitoring the estimates of likelihood of occurrence the sets of types of untyped variables associated with executable basic blocks of the plurality; and reordering the executable basic blocks of the plurality if the estimates of likelihood of occurrence of the sets of types change.

13. A non-transitory computer-readable storage medium storing computer-executable cope for incremental compilation of script code at runtime, the code comprising instructions for:

storing a script comprising basic blocks, wherein a basic block is a set of instructions with a single entry point, the script using one or more untyped variables;

for each of a set of basic blocks of the script, storing a plurality of executable basic blocks for the basic block, each executable basic block comprising code optimized for a set of types of untyped variables used in the basic block;

receiving a request for executing the script;

identifying a basic block from the script;

receiving an input set of values for variables of the basic block;

determining an input set of types of untyped variables of the basic block based on the input set of values;

determining whether the input set of types of untyped variables match a set of types of a stored executable basic block for the basic block; and executing an executable basic block for the basic block if the input set of types of untyped variables match the set of types of the executable basic block.

14. The non-transitory computer-readable storage medium of claim 13, wherein the script compiler is further configured to:

check if at least one executable basic block corresponding to the basic block is available; and wherein the executable basic block corresponding to the basic block is generated responsive to determining that no executable basic block corresponding to the basic block is available.

15. The non-transitory computer-readable storage medium of claim 13, wherein the request received is a first request, the code further comprising instructions for:

receiving a second request for subsequent execution of the script; and responsive to determining that executable code corresponding to the basic block was previously generated for the set of types, executing instructions of the executable basic block for the subsequent execution of the script.

16. The non-transitory computer-readable storage medium of claim 13, wherein the executable basic block transfers control to a byte code compiler responsive to determining that executable code for a subsequent basic block was not previously generated.

17. The non-transitory computer-readable storage medium of claim 13, wherein the executed basic block evaluates a condition and the executed basic block is configured to:

transfer control to a first executable basic block for execution responsive to the condition evaluating to true; and transfer control to a second executable basic block for execution responsive to the condition evaluating to false.

18. The non-transitory computer-readable storage medium of claim 13, wherein the request is a first request, the input set of values is a first input set of values, the set of types is a first set of types, and the executable basic block is a first executable basic block, the code further comprising instructions for:

receive a second request for execution of the script;

receive a second input set of values for variables of the basic block;

determining that the second input set of values does not conform to the first set of types;

responsive to determining that the second input set of values does not conform to the first set of types, generate a second executable basic block for the basic block; and store the second executable basic block.

19. A computer implemented method comprising:

receiving requests for executing a script, the script comprising a basic block, wherein a basic block is a set of instructions with a single entry point, the script using one or more untyped variables;

determining a plurality of combinations of types corresponding to untyped variables of the basic block, each combination of types encountered during executions of the script;

for each combination of types, generating, at runtime, an executable basic block corresponding to the basic block, the executable basic block comprising a guard set of instructions and a body set of instructions; and executing the script in response to a new request, the execution comprising:

identifying the basic block for execution;

determining a current combination of types for a set of values corresponding to untyped variables of the basic block based on the current execution of the script; and executing the body set of instructions of a matching executable basic block if the guard set of instructions of the matching executable basic block determine that the current combination of types matches the combination of types of untyped variables corresponding to the executable basic block.

20. The computer implemented method of claim 19, wherein the execution of the script further comprises:

responsive to failing to find a match between the current combination of types of untyped variables and each of the plurality of combinations of types, generating a new executable basic block for the basic block corresponding to the current combination of types of untyped variables.

21. The computer implemented method of claim 20, wherein the new executable basic block for the basic block is generated responsive to the total number of executable basic blocks for the basic block being below a threshold number.

22. The computer implemented method of claim 20, wherein the execution of the script further comprises:

responsive to failing to find a match between the current combination of types of variables and each of the plurality of combinations of types, and responsive to the number of executable basic blocks meeting a threshold number, interpreting the code of the basic block.

23. A non-transitory computer-readable storage medium storing computer-executable code for incremental compilation of script code at runtime, the code comprising instructions for:

receiving requests for executing a script, the script comprising a basic block, wherein a basic block is a set of instructions with a single entry point, the script using one or more untyped variables;

determining a plurality of combinations of types corresponding to untyped variables of the basic block, each combination of types encountered during executions of the script;

for each combination of types, generating, at runtime, an executable basic block corresponding to the basic block, the executable basic block comprising a guard set of instructions and a body set of instructions; and executing the script in response to a new request, the execution comprising:

identifying the basic block for execution;

determining a current combination of types for a set of values corresponding to untyped variables of the basic block based on the current execution of the script; and executing the body set of instructions of a matching executable basic block if the guard set of instructions of the matching executable basic block determine that the current combination of types matches the combination of types of untyped variables corresponding to the executable basic block.

24. The non-transitory computer-readable storage medium of claim 23, wherein the execution of the script further comprises:

responsive to failing to find a match between the current combination of types of untyped variables and each of the plurality of combinations of types, generating a new executable basic block for the basic block corresponding to the current combination of types of untyped variables.

25. The non-transitory computer-readable storage medium of claim 24, wherein the new executable basic block for the basic block is generated responsive to the total number of executable basic blocks for the basic block being below a threshold number.

26. The non-transitory computer-readable storage medium of claim 24, wherein the execution of the script further comprises:

responsive to failing to find a match between the current combination of types of variables and each of the plurality of combinations of types, and responsive to the number of executable basic blocks meeting a threshold number, interpreting the code of the basic block.

* * * * *